Nov. 5, 1957

C. N. McCARTHY 2,811,865

TRANSMISSION CONTROL

Filed June 15, 1954

INVENTOR
Charles N. McCarthy
BY
T. L. Chisholm
ATTORNEY

INVENTOR
Charles N. McCarthy
BY
T. L. Chisholm
ATTORNEY

United States Patent Office 2,811,865
Patented Nov. 5, 1957

2,811,865

TRANSMISSION CONTROL

Charles N. McCarthy, Royal Oak, Mich., assignor to General Motors Corporation, Detroit, Mich., a corporation of Delaware Application June 15, 1954, Serial No. 436,917

11 Claims. (Cl. 74—477)

This invention relates to a transmission and more particularly a control mechanism which may be mounted on either side of the transmission housing.

An object of this invention is to provide a transmission housing where the selector and shift control may be mounted alternatively on opposite sides of the transmission.

Another object of the invention is to provide a transmission control mechanism having a shifting shaft having symmetrical mounting supports at opposed sides of the transmission housing.

Another object of the invention is to provide a transmission housing having symmetrical mounting supports for the selector and shift control mechanism.

Another object of the invention is to provide a transmission having a shift control mechanism arrangement for mounting at either side of the transmission housing in symmetrical mounting supports on the housing and a selector control mechanism mounted alternatively in a mounting support on either side of the housing.

These and other objects of the invention will be made clearer by the following drawing and description of the invention.

Figure 1:
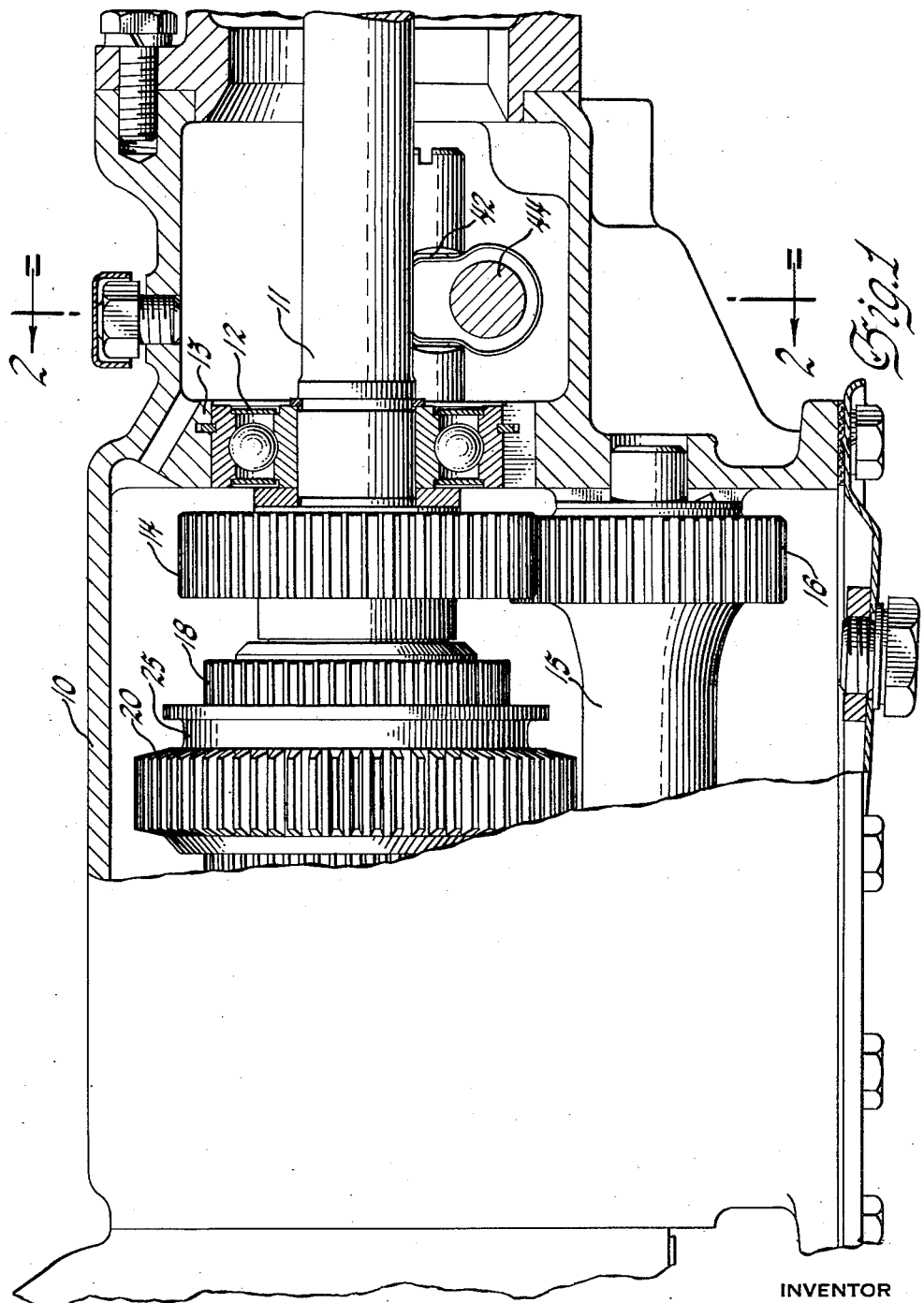
Fig. 1 is a view of the transmission housing with parts in section showing the control mechanism.
Figure 2:
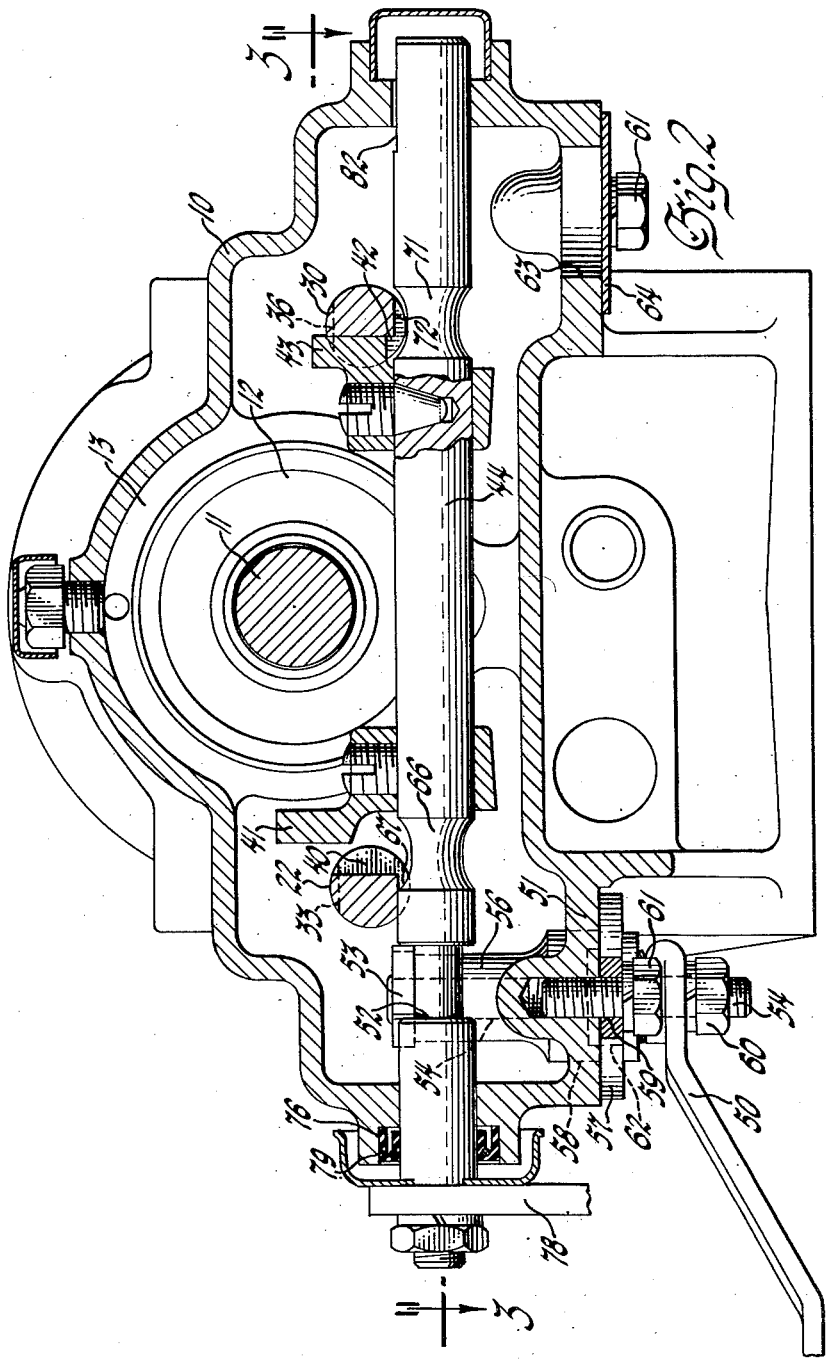
Fig. 2 is a section of Figs. 1 and 3 on the line 2—2 with parts broken away to show additional details.

This sliding gear type transmission is provided with a symmetrical gear housing and a symmetrically arranged control mechanism so that the transmission control may be mounted for access and connection to the control mechanism mounted on the mast jacket or steering column from either side of the transmission. This construction makes it possible to use this transmission on either right or left hand drive vehicles. The transmission housing is provided with symmetrically arranged identical bosses and the transmission control linkage mechanism is constructed so that it may be installed to provide access from either side of the transmission.

The symmetrical control arrangement is illustrated as being employed on a conventional synchromesh or sliding gear type transmission mounted in a housing 10. The driven shaft 11 is rotatably mounted in a bearing 12 located in the rear wall 13 of the main transmission housing. The driven shaft 11 extends forwardly into the main transmission housing 10 and has rotatably mounted thereon the second speed drive gear 14. The countershaft 15 is continuously driven by the clutch output gear shaft in the conventional manner. This conventional gearing (not shown) generally consists of a gear fixed to the clutch output shaft or transmission input shaft which constantly meshes with a gear fixed to the forward end of the countershaft 15. The constantly driven countershaft has fixed thereon the second speed countershaft gear 16 which is always in mesh with the second speed gear 14. The second and third speed clutch 18 is suitably splined to the driven shaft 11 for axial sliding movement in the conventional manner and clutches the second speed gear 14 to the driven shaft 11 when it is moved rearwardly and clutches the driven shaft 11 to the clutch gear shaft (not shown) when it is moved forwardly for third speed or direct drive. The conventional first and reverse gear 20 is internally splined for sliding movement on the second and third speed clutch sleeve 18 and is moved forwardly to mesh with the countershaft low speed drive gear (not shown) or rearwardly to mesh with the reverse pinion (not shown) which is driven from the low speed countershaft drive gear for reverse.

The first and reverse sliding gear 20 is controlled by means of the first and reverse shift rail 22 which is slidably mounted in a bore 23 in the rear wall 13 of the transmission housing and another bore (not shown) in the forward portion of the housing. A shift fork 24 is fixed on the first and reverse shift rail 22 and engages the annular groove 25 in the first-reverse gear. In order to prevent rotation of the shift rail 22, the pin 26 which is fixed on the housing 10 extends into an axial groove 27 in the side of the shift fork 24 facing the housing. The second and third speed shift rail 30 is connected adjacent its forward end to a similar fork member (not shown) which engages a similar groove in the second and third shift sleeve. The second-third shift fork is also guided by a similar pin fixed in the housing and cooperating with a slot in the shift fork to prevent rotation of the shift rail 30. The conventional shift rail 22 has three indentations or recesses which cooperate with a spring loaded detent (not shown) mounted in the housing to resiliently position the rail in the shift positions. The center recess 32 engaging the detent in the neutral position, the right hand recess 33 engaging the detent in the first speed position and the left hand recess 34 engaging the detent in the reverse position. Similar recesses in second and third speed shift rail 30 are provided to cooperate with a spring loaded detent (not shown) mounted in the housing. On shift rail 30 the center recess 35 engages the detent in the neutral position while the right hand recess 36 engages the detent in the third speed drive position and the left hand recess 37 engages the detent in the second speed drive position. The first reverse shift rail 22 has a transverse recess 40 cooperating with a shifting cam 41. The second-third shift rail 30 has a similar transverse recess 42 cooperating with the shifting cam 43. The shifting cams 41 and 43 are fixed on the cross shift shaft 44 by suitable conical set screws fitting into conical bores in the shaft. The shaft is rotatably and slidably mounted in bores 46 and 47 located in the symmetrically arranged opposed bosses 48 and 49 of the transmission housing 10. It will be noted that both ends of the cross shift shaft 44 have identical diameters and the bores 46 and 47 also have identical diameters to permit the cross shift shaft 44 to be mounted from either side of the transmission.

Adjacent one end of the cross shift shaft there is an annular groove 52 which cooperates with a selector cam 53 rigidly mounted on a selector shaft 54. The selector shaft 54 is rotatably mounted in a tubular bushing member 56 having a flange 57 which fits against the outside of the lower portion 51 of the transmission housing. The flange 57 is provided with suitable apertures 59 for bolts 61 which secure bushing 56 to the transmission housing. The shaft 54 extends through the bushing 56 and a seal 62 to a point externally of the transmission housing where it is rigidly connected by flats on the shaft to a selector control lever 50. The lever 50 is suitably retained on the shaft 54 by a bolt 60.

The transmission housing is provided with a bore 63 which is identical with the bore 58 and symmetrically arranged on the opposite side of the shift shaft 44. When the bore 63 is not used it is covered by a plate 64 suitably screwed to the housing. It will be noted that for complete interchangeability of the selector assembly 56 and the cover plate 64, that the threaded holes for screws 61 and the screws for plate 64 are identical and spaced the same distance apart. This arrangement permits shifting the selector control mechanism as a unit from one side of the transmission to the other for either right or left hand drive vehicles. The plate 64 can also be used on either side. When the side on which the selector control is mounted, is known, the aperture 63 on the other side may be made smaller or omitted.

The cross shift shaft 44 and the shift rails 22 and 30 are provided with an interlocking mechanism to permit shifting of only one rail at a time. There is a rounded interlock groove 66 in the cross shift shaft for cooperation with the rail 22. When the selector mechanism is in the first-reverse position the groove 66 is beneath the first-reverse rail 22 to permit it to move and the other rail is locked. The rail 22 has a transverse recess 67 shaped to fit the external surface of the cross shift shaft 44 and positioned over the cross shift shaft 44 when the rail 22 is in the neutral position. The groove 67 of the shift rail 22 interlocks with shift shaft 44 to lock the first-reverse rail 22 in neutral when the selector mechanism is in the second-third position. There is a similar rounded recess 71 in the cross shift shaft 44 underlying the second-third shift rail 30 which permits movement of the shift rail when the shift shaft is in the second-third position. The transverse groove 72 in the shift rail 30 cooperates with the external surface of the shift shaft 44 to prevent movement from neutral of the shift rail 30 when the selector control is in the first-reverse position and has moved the cross shift shaft axially to engage the first-reverse rail 22.

The bores 46 and 47 in which the cross shift shaft 44 is mounted have identical external counterbores 76 and 77 respectively. On the side where the control lever 78 is rigidly attached to the cross shift shaft the seal 79 is positioned in the counterbore 76 surrounding the shaft 44. On the other side of the transmission housing, a cup-shaped cap 81 is positioned in the counterbore 77 to seal the bore 47. Since the air entrapped in the cup 81 would interfere with the free movement of the shift shaft 44 a slot or keyway 82 is formed on the end of the shaft to provide an air and oil passage between the main transmission housing and the cup.

The transmission control mechanism operates to shift gears in the usual manner. The selector control lever 56 is first moved and through the cam 53 and slot 52 connection with the shaft 44 moves the shaft axially to position either the groove 66 in alignment with the first-reverse shift rail 22 on the groove 71 in alignment with the shift rail 30. When the groove 66 is in alignment with the shift rail 22 the cam 41 is positioned in the groove 40 and then rotary movement of the shift lever 78 will rotate the shaft 44 and move the shift rail 22 in axial direction to shift the transmission into either first or reverse gear. At this time groove 72 of shift rail 30 engages the shift shaft 44 to lock rail 30. When the groove 71 of the shaft 44 is in alignment with second-third shift rail 30 the cam 43 is in the groove 42 of the shift rail 30 and rotary movement of the shaft 44 will move the shift rail 30 axially to either the second or third position. When the shift rail 30 and shaft 44 are in this latter position for shifting to second or third, the groove 67 or shift rail 22 fits over the full diameter portion of the shaft 44 and prevents movement of the rail 22.

Figure 3:
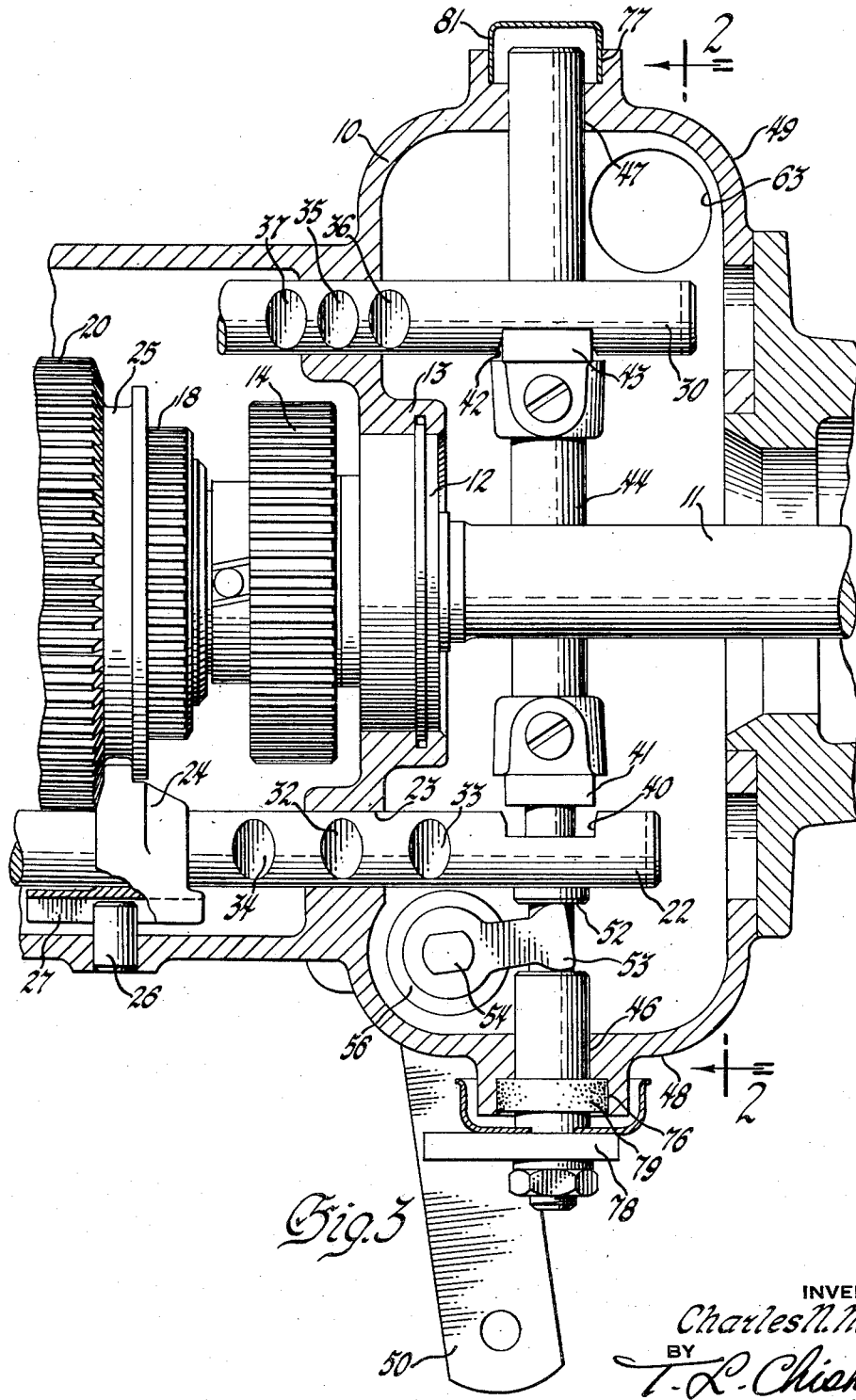
Fig. 3 is a section of Fig. 2 on the line 3—3 with parts broken away to show additional details.

The transmission shift control is mounted symmetrically within the transmission and the transmission housing is provided with symmetrically arranged supporting bosses for the transmission shift control so that the control may be mounted for operation from either side of the transmission. The shift rails 22 and 30 are located symmetrically on opposite sides of the transmission housing. The transmission housing 10 also has symmetrical bosses 48 and 49 located on opposing sides of the transmission housing 10. These bosses contain identical bores 46 and 47 which provide a mounting bearing for the cross shift shaft 44. The bosses 48 and 49 also have identical counterbores 76 and 77. Thus it will be seen that the cross shift shaft 44 may be assembled with the control lever 78 on the left side of the transmission housing as illustrated in Fig. 3 or reversed to provide a control lever 78 on the right side of the transmission housing. In order to do this it is merely necessary to remove the cross shift shaft 44. This can be done after the selector control and the cams 41 and 43 are removed from the shaft. The profile of the selector cam 53 is designed with an enlarged end having curved side faces, as shown in Fig. 3, so that it will rotate out of the slot 52 when the shift shaft is moved axially out of the housing 10. Cams 41 and 43 are removed from the shaft by loosening the set screws and sliding them off the shaft as it is slid out of the transmission housing. Cross shift shaft 44 is then inserted from the opposite end of the transmission, first removing the cover 81 and inserting in the opposite counterbore 76. As the cross shift shaft 44 is being slid into the transmission housing the cams 41 and 43 are again positioned on the shaft in proper relationship to the shift rails and cam 53 rotated in slot 52. When the shaft is located on the opposite side of the transmission the seal 79 will fit into the counterbore 77 to seal this end to the shaft.

The selector control mechanism consisting of the housing 56, cam 53, shaft 54 and control lever 50 are removed as a unit. In order to do this, it is merely necessary to remove the two bolts 61 and slide the assembly downwardly out of the transmission housing. In order to insert this control assembly in the other side of the transmission, it is merely necessary to remove the screws and the cover plate 64 and insert the assembly into the bore 63 and bolt it to the transmission housing by means of the bolts 61. Cover plate 64 may then be positioned over the bore 58 on the opposite side of the transmission and fastened by the screws. This symmetrically located and arranged transmission control mechanism makes it possible to assemble the control mechanism in the transmission so that the actuating levers are on either the left or right side of the transmission housing. This permits this control mechanism to be connected to the steering column control lever for either right or left hand drive vehicles.

The illustrated embodiment of the invention discloses the preferred form. Other modifications may be made in accordance with the scope of the appended claims.

I claim:

1. In a transmission, a housing having symmetrically arranged transversely aligned bores of the same diameter located in opposed sides of the housing, a cross shift shaft rotatably and slidably mounted in said bores and having a shift lever fixed to one end of said shaft located externally of one side of said housing, cooperating means on said shift shaft to shift the transmission in response to rotary movement of said shaft, said housing having symmetrically located apertures located on opposite sides of said longitudinal center line of the housing, one aperture being forward of said cross shift shaft and the other being rearward of said cross shift shaft, a unitary selector assembly fitting within one of said apertures on said one side of said housing having internal means cooperating with said cross shift shaft to axially shift said shaft, and external control means connected to said internal control means to actuate said internal control means, said selector assembly being removably secured to said housing, said shift shaft being insertable to position the shift lever on the other side of the housing, and said selector assembly being insertable in the other aperture to cooperate with said shift shaft to position said shift lever and external selector lever on the other side of said housing.

2. In a transmission, a housing having symmetrically arranged transversely aligned bores of the same diameter located in opposed sides of the housing, a cross shift shaft rotatably and slidably mounted in said bores and having a shift lever fixed to one end of said shaft located externally of one side of said housing, cooperating means on said shift shaft to shift the transmission in response to rotary movement of said shaft, said housing having symmetrically located apertures located on opposite sides of said longitudinal center line of the housing, one aperture being forward of said cross shift shaft and the other being rearward of said cross shift shaft, a unitary selector assembly fitting within one of said apertures on said one side of said housing, having a shaft extending within said bushing, internal means cooperating with said cross shift shaft to axially shift said shaft, and an external shift control lever, said selector assembly being removably secured to said housing, said shift shaft being insertable to position the shift lever on the other side of the housing, and said selector assembly being insertable in the other aperture to cooperate with said shift shaft to position said shift lever and external selector lever on the other side of said housing.

3. In a transmission, a housing having symmetrically arranged transversely aligned bores of the same diameter located in opposed sides of the housing, a cross shift shaft rotatably and slidably mounted in said bores and having a shift lever fixed to one end of said shaft located externally of one side of said housing, symmetrically arranged shift means on each side in said housing, cooperating means on said shift shaft to engage said shift means to shift the transmission in response to rotary movement of said shaft, said housing having symmetrically located apertures located on opposite sides of said longitudinal center line of the housing, one aperture being forward of said cross shift shaft and the other being rearward of said cross shift shaft, a unitary selector assembly fitting within one of said apertures on said one side of said housing, a shaft extending within said bushing, an internal lever cooperating with said cross shift shaft to axially shift said shaft, and an external shift control lever, said selector assembly being removably secured to said housing, said shift shaft being insertable to position the shift lever on the other side of the housing, and said selector assembly being insertable in the other aperture to cooperate with said shift shaft to position said shift lever and external selector lever on the other side of said housing.

4. In a transmission, a housing having symmetrically arranged transversely aligned bores of the same diameter located in opposed sides of the housing, a cross shift shaft rotatably and slidably mounted in said bores and having a shift lever fixed to one end of said shaft located externally of one side of said housing, cooperating means on said shift shaft to shift the transmission in response to rotary movement of said shaft, said housing having symmetrically located apertures located on opposite sides of said longitudinal center line of the housing, one aperture being forward of said cross shift shaft and the other being rearward of said cross shift shaft, a unitary selector assembly having a bushing fitting within one of said apertures on said one side of said housing, a shaft extending within said bushing, an internal lever fixed on said shaft cooperating with said cross shift shaft and to axially shift said shaft, an external shift control lever, and an external flange on said bushing secured to the outside surfaces of said housing, said shift shaft being removable and insertable as a unit to position the shift lever on the other side of the housing, said cooperating means on said shift shaft shifting the transmission in response to rotary movement of said shaft, and said unitary selector assembly being removable and insertable in the other aperture as a unit so that said internal lever cooperates with said shift shaft to position said shift lever and external selector lever on the other side of said housing.

5. In a transmission, a housing having symmetrically arranged bosses on opposite sides of the housing, said bosses having transversely aligned bores of the same diameter, a pair of shift rails extending longitudinally and symmetrically arranged about the longitudinal center line of said housing, a cross shift shaft rotatably and slidably mounted in said bores and having a recess located within said housing and a shift lever fixed to one end of said shaft located externally of said housing adjacent one of said bosses, cooperating means on said shift shaft and said rails to shift said rails longitudinally in response to rotary movement of said shaft, said housing having symmetrically located apertures located on opposite sides of said longitudinal center line of the housing, one aperture being forward of said cross shift shaft and the other being rearward of said cross shift shaft, a unitary selector assembly having a bushing fitting within one of said apertures, a selector shaft extending within said bushing, an internal lever fixed to said selector shaft and cooperating with said recess on said cross shift shaft to axially shift said shaft, an external shift control lever, and an external flange securing said bushing to the outside surface of said housing, said shift shaft being insertable to position the shift lever on the other side of the housing adjacent the other boss, and said selector assembly being removable as a unit from said one aperture and insertable in the other aperture to position said internal lever to cooperate with said recess on said shift shaft.

6. In a transmission, a housing having symmetrically arranged bosses on opposite sides of the housing, said bosses having transversely aligned bores of the same diameter and counterbores of the same diameter, a pair of shift rails extending longitudinally and symmetrically arranged about the longitudinal center line of said housing, a cross shift shaft rotatably and slidably mounted in said bores and having a shift lever fixed to one end of said shaft located externally of said housing, a seal surrounding said shaft located in one counterbore, a closure located in the other counterbore, cooperating means on said shift shaft and said rails to shift said rails longitudinally in response to rotary movement of said shaft, said housing having symmetrically located apertures located on opposite sides of said longitudinal center line of the housing, one aperture being forward of said cross shift shaft and the other being rearward of said cross shift shaft, a unitary selector assembly having a bushing fitting within one of said apertures, a shaft extending within said bushing, an internal lever cooperating with said cross shift shaft to axially shift said shaft, an external shift control lever, and an external flange on said bushing for securing said assembly to the outside surfaces of said housing, said shift shaft being insertable to position the shift lever seal and closure on the opposite side of the housing, and said selector assembly being removable and insertable as a unit in the opposite aperture to cooperate with said shift shaft.

7. In a transmission having a plurality of gear ratios, a housing, a pair of shift elements mounted in said housing and operatively connected to change the gear ratios, a first mounting means on said housing, shift means supported by said first mounting means and having an operating portion located in said housing and having a control portion located externally of said housing at one side, a second mounting means on said one side of said housing, selector control means mounted on said second mounting means on said housing and cooperating with said shift means to couple said shift means with either of said shift elements and having an actuating portion located externally of said housing on the same side as said control portion of said shift means, said shift means being reversible in said first mounting means to position said control portion externally of said housing on the other side of said housing and said operating portion in said housing to cooperate with said shift elements, a third mounting means on said other side of said housing, and said selector means being removable from said second mounting means for positioning on said third mounting means for cooperation with said shift means in the reversed position to couple said shift means to either of said shift elements.

8. In a transmission having a plurality of gear ratios, a housing, a pair of shift elements mounted in said housing and operatively connected to change the gear ratios, a first mounting means on said housing, shift means supported by said first mounting means and having an operating portion located in said housing and having a control portion located externally of said housing at one side, a second mounting means on said housing, selector control means mounted on said second mounting means on said housing and cooperating with said shift means to couple said shift means with either of said shift elements and having an actuating portion located externally of said housing on the same side as said control portion of said shift means, said shift means being reversible in said first mounting means to position said control portion externally of said housing on the other side of said housing and said operating portion in said housing to cooperate with said shift elements, a third mounting means on said housing, and said selector means being removable from said second mounting means for positioning on said third mounting means for cooperation with said shift means in the reversed position to couple said shift means to either of said shift elements.

9. In a transmission, a housing having bores located in opposed sides of said housing, a shaft extending across said housing and rotatably and slidably mounted in said bores and having a lever fixed to one end of said shaft located externally of one side of said housing, cooperating means on said shaft to shift the transmission in response to rotary movement of said shaft, said housing having apertures located on opposite sides, a unitary selector assembly fitting within one of said apertures on said one side of said housing having internal means cooperating with said shaft to axially shift said shaft, and external control means connected to said internal control means to actuate said internal control means, said selector assembly being removably secured to said housing, said shaft being insertable to position said shift lever on the other side of said housing, and said selector assembly being insertable in the other aperture to cooperate with said shaft to position said shift lever and external control means on the other side of said housing.

10. In a transmission, a housing having bores located in opposed sides of the housing, a shaft extending across said housing mounted for rotatable and slidable movement in said bores and having a shaft control fixed to one end of said shaft located externally of one side of said housing, cooperating means on said shaft to shift the transmission in response to one movement of said shaft, said housing having apertures located on opposite sides, a control assembly fitting within one of said apertures on said one side of said housing having internal means cooperating with said shaft to provide the other movement, and external control means connected to said internal control means to actuate said internal control means, said control assembly being removably secured to said housing, said shaft being insertable to position said shaft control on the other side of said housing, and said control assembly being insertable in the other aperture to cooperate with said shaft to position said shaft control and external control means on the other side of said housing.

11. In a transmission, a housing having support means with a portion located on opposed sides of the housing, a shift member mounted on said support means for shifting and selecting movement and having a first control means operatively connected to said shift member to provide one of said movements and located externally of one side of said housing, cooperating means on said shift member to shift the transmission in response to one movement of said shift member, said housing having apertures located on opposite sides of said housing, a control assembly fitting within one of said apertures on said one side of said housing having internal means cooperating with said shift member to provide the other movement, and external control means connected to said internal control means to actuate said internal control means, said control assembly being removably secured to said housing, said shift member being reversible to position said first control means on the other side of said housing, and said control assembly being insertable in the other aperture to cooperate with said shift member to position said first control means and external control means on the other side of said housing.

References Cited in the file of this patent

UNITED STATES PATENTS

| | | |
|---|---|---|
| 1,696,094 | Kirchhoff | Dec. 18, 1928 |
| 2,195,269 | Coughtry | Mar. 26, 1940 |
| 2,600,912 | Olson | June 17, 1952 |
| 2,636,390 | Wagner | Apr. 28, 1953 |